US009874030B2

(12) United States Patent
Thiers et al.

(10) Patent No.: US 9,874,030 B2
(45) Date of Patent: Jan. 23, 2018

(54) CERAMIC TILE AND METHOD FOR MANUFACTURING CERAMIC TILES

(71) Applicant: FLOORING INDUSTRIES LIMITED, SARL, Bertrange (LU)

(72) Inventors: Bernard Thiers, Eine (BE); Christine Walmsley-Scott, Waldbredimus (LU); Bart Van Der Stockt, Zwalm (BE)

(73) Assignee: FLOORING INDUSTRIES LIMITED, SARL, Bertrange (LU)

( * ) Notice: Subject to any disclaimer, the term of this patent is extended or adjusted under 35 U.S.C. 154(b) by 0 days.

(21) Appl. No.: 15/102,447

(22) PCT Filed: Dec. 18, 2014

(86) PCT No.: PCT/IB2014/067092
§ 371 (c)(1),
(2) Date: Jun. 7, 2016

(87) PCT Pub. No.: WO2015/092745
PCT Pub. Date: Jun. 25, 2015

(65) Prior Publication Data
US 2016/0319554 A1 Nov. 3, 2016

Related U.S. Application Data

(60) Provisional application No. 61/919,196, filed on Dec. 20, 2013.

(51) Int. Cl.
*B32B 3/00* (2006.01)
*E04F 15/08* (2006.01)
*B44C 1/24* (2006.01)
*C04B 33/34* (2006.01)
(Continued)

(52) U.S. Cl.
CPC ............... *E04F 15/08* (2013.01); *B44C 1/24* (2013.01); *B44C 5/04* (2013.01); *B44C 5/06* (2013.01);
(Continued)

(58) Field of Classification Search
CPC ....... C04B 41/52; C04B 41/009; C04B 41/89; C04B 41/4578; B44C 5/04; B44C 5/06; B44C 1/24; E04F 15/02161; E04F 15/0215; E04F 15/082; E04F 15/08
See application file for complete search history.

(56) References Cited

U.S. PATENT DOCUMENTS 8,507,098 B2 8/2013 Long et al.
2010/0032086 A1* 2/2010 Hwang ................ B28B 11/001
156/268

FOREIGN PATENT DOCUMENTS

BE 1019265 A3 5/2012
CN 203080849 U 7/2013
(Continued)

OTHER PUBLICATIONS

International Search Report (ISR) dated May 19, 2015, for PCT/IB2014/067092.

*Primary Examiner* — Elizabeth E Mulvaney
(74) *Attorney, Agent, or Firm* — Bacon & Thomas, PLLC

(57) ABSTRACT

Ceramic tile having a ceramic base layer and a cover glaze layer comprising a printed pattern, wherein the surface of the ceramic tile comprises a relief having structural features corresponding to said printed pattern. The invention further concerns a method which allows for the manufacturing of such ceramic tiles.

15 Claims, 1 Drawing Sheet

(51) Int. Cl.

| | | |
|---|---|---|
| *C04B 41/89* | (2006.01) | |
| *C04B 41/00* | (2006.01) | |
| *C04B 41/52* | (2006.01) | |
| *B44C 5/04* | (2006.01) | |
| *B44C 5/06* | (2006.01) | |
| *C04B 41/45* | (2006.01) | |
| *E04F 15/02* | (2006.01) | |

(52) U.S. Cl.
 CPC ............ *C04B 33/34* (2013.01); *C04B 41/009* (2013.01); *C04B 41/4578* (2013.01); *C04B 41/52* (2013.01); *C04B 41/89* (2013.01); *E04F 15/0215* (2013.01); *E04F 15/02161* (2013.01)

(56) References Cited

FOREIGN PATENT DOCUMENTS

| CN | 103241049 A | 8/2013 |
|---|---|---|
| DE | 3113661 A1 | 10/1982 |
| EP | 1038689 A1 | 9/2000 |
| ES | 2196991 A1 | 12/2003 |
| GB | 1320637 A | 6/1973 |
| JP | H02-125059 A | 5/1990 |
| JP | H03-150283 A | 6/1991 |
| KR | 2010-0004491 U | 5/2010 |
| WO | 01/51573 | 7/2001 |
| WO | 2006/126189 A1 | 11/2006 |
| WO | 2014/109700 A1 | 7/2014 |
| WO | 2015/005860 A1 | 1/2015 |

* cited by examiner

CERAMIC TILE AND METHOD FOR MANUFACTURING CERAMIC TILES

CROSS REFERENCE TO RELATED APPLICATIONS

This application claims the benefit under 35 U.S.C. 119(e) to the U.S. provisional application No. 61/919,196 filed on Dec. 20, 2013.

The present invention relates to ceramic tiles and a method of manufacturing ceramic tiles.

The invention is in particular concerned with ceramic tiles having a ceramic base layer and a cover glaze layer comprising a printed pattern.

BACKGROUND

Such ceramic tiles are well known. ES 2 196 991 describes a method of manufacturing ceramic tiles wherein the pattern is printed by means of screen printing or rotary serigraphy. EP 1 038 689 describes a digital printing technique for decoration of ceramic tiles, for example with a marble motif, in which a multicolor printing is effected in a single pass of the tile underneath a plurality of printing modules. The printing is effected before a first baking or between successive bakings. Although intricate patterns can be created with these techniques, the obtained surface of the ceramic tile is monotonous. CN 103241049 A shows an example of the intricacy that can be obtained with marble motifs.

CN 203080849 U describes an equipment for producing a full polished glaze porcelain tile. This equipment comprises a green brick processing equipment for producing a ceramic base layer, a cover glaze layer is sprayed and an pattern may be printed using an inkjet printing equipment. The equipment further comprises a kiln for firing the tiles.

From DE 31 13 661 A1 it is known to provide the ceramic base layer with a chamfered perimeter. From GB 1 320 637 it is known to provide a surface of a the with a relief. The tiles from these documents do not feature prints, the obtained relief is rather coarse and each the features an identical relief. Such technique, in particular such relief, is hence not suited for ceramic tiles that imitate natural products such as wood and stone.

U.S. Pat. No. 8,507,098 and BE 1019265 describe examples of glaze layers applied to ceramic base layers and methods of applying glaze. In these cases it concerns basically so-called dry glazes. JP 3-150283 discloses dry as well as wet glazes for ceramic tiles, wherein a smooth surface of the cover glaze layer is obtained after a pressing operation.

Ceramic tiles having a printed pattern showing a wood grain are known as well. Such tiles often have a rectangular and oblong shape with the grain lines running substantially in a longitudinal direction. The relief provided on the surface of such tiles, if any at all, is coarse and appears artificial. When no relief is applied, or only random relief features, the tiles may look glossy when viewed against light, and appear as a white surface due to the mirror-like light reflection on the glaze layer.

Ceramic tiles of rectangular and oblong shape bring about problems in installation. Such ceramic tiles may be somewhat domed and laying the tiles next to each other in an offset relationship creates height differences which are clearly noticeable especially when viewed against the light. An offset relationship between installed tiles in adjacent rows is especially desirable where the tiles have a printed pattern showing a wood grain.

SUMMARY OF THE INVENTION

The present invention in the first place aims at an alternative ceramic tile, which, in accordance with its several preferred embodiments, could offer a solution to one or more problems with the tiles of the state of the art. Therefore, the invention concerns a ceramic tile having a ceramic base layer and a cover glaze layer comprising a printed pattern, with the characteristic that the surface of the ceramic tile comprises a relief having structural features corresponding to said printed pattern. In other words, the ceramic tile is characterized by the fact that one or more relief features are positioned in a fixed relation to a feature of the printed pattern. E.g. the relief feature may coincide with a printed feature, follow a printed feature or be positioned at a defined distance to a relief feature. The correspondence between certain relief features and the printed pattern leads to a less artificial impression of the ceramic tile.

The invention is especially interesting in an installation where oblong rectangular tiles of adjacent rows are present in an offset relationship. The possible height differences originating from adjacent offset domed tiles may appear less prominent when viewed against light, since the irregular surface will reflect the falling-in light more diffuse. Furthermore, the attention of the viewer will be distracted by the intricate relief features.

DETAILED DESCRIPTION OF THE INVENTION

According to an important preferred embodiment of the invention irregular or random relief features distributed over the entirety of the surface of the ceramic tile, or essentially over the entirety of the surface of the ceramic tile, are combined with the structural features that correspond to the printed pattern. An optimum counteraction of mirror-like reflection of light may be achieved with this preferred embodiment. Preferably the irregular or random relief features define an average depth or height which is smaller than the average depth or height of the structural relief features that correspond to the printed pattern. It is noted that the average depth or height of these features may be recorded using techniques similar to those commonly used in the area of surface roughness measurements, in particular similar to those used for defining the Ra-values of a roughness profile, namely by recording and calculating the arithmetic average of absolute deviation from an average plane. Preferably such irregular or random relief features define an Ra value of at least 10 micron, but is preferably higher, namely around 25 micron or more, or even around 50 micron or more.

The structural features that correspond to the printed pattern preferably have an average depth or height of at least 100 micron, or even better at least 250 micron.

Preferably, said relief is basically formed as a plurality of excavations present in the generally plane upper surface of the ceramic tile.

Preferably said printed pattern and/or said relief extends substantially over the entire surface of the ceramic tile. It is clear that the structural relief features that correspond to the printed pattern are available throughout the surface of the ceramic tile, without covering the entire surface of the ceramic tile, while the above mentioned optional irregular or random features preferably do cover the entire surface of the ceramic tile. When imitating a wood material, wood grain imitating structural relief features are available in accordance with all available printed wood grain lines, while in between the printed wood grain lines such structural relief features are not available. Instead, in between the printed wood grain lines the aforementioned irregular or random relief features may be available.

Preferably, said printed pattern represents a wood or stone pattern, preferably representing only one one-piece wooden plank or stone tile over the entire surface of the ceramic tile.

According to a preferred embodiment, said printed pattern is a wood pattern and said structural features are lines following the course of the grain lines of the wood pattern and/or a plurality of successive dashes having a configuration following the grain lines of the wood pattern.

Said structural features may be formed in the surface of the ceramic base layer and manifest themselves through the glaze layer to the upper surface of the tile. However, preferably said structural features have a depth such that they are substantially or completely situated above said ceramic base layer. Such structural features can be made less coarse.

Preferably, said cover glaze layer at least comprises a glaze layer of uniform color arranged underneath said printed pattern, preferably of white, beige or grey color. Such glaze layer may hide imperfections in the surface of the ceramic base layer. The use of glazes of a color other than white may lead to a lowering of the needed ink lay-up for obtaining the desired colors in the printed pattern.

Preferably, said cover glaze layer is obtained at least partially from a so-called wet glaze. In the most preferred embodiment, said structural features are formed in the surface of the ceramic base layer and the structured surface of the ceramic base layer is provided with a wet applied glaze layer. A wet applied glaze layer is preferred because of its power to copy the structure of the ceramic base layer at its own surface. Such wet glaze layer preferably relates to an aqueous suspension of at least silica or $SiO_2$, preferably in a quantity higher than 20 percent dry weight of the suspension and even more preferable between 30 and 75 percent dry weight. Preferably the suspension also comprises a flux component for lowering the melting temperature of the glaze. It is of course not excluded that said cover glaze layer would be obtained at least partially from a so-called dry glaze. In such case, the dry glaze is preferably made up from particles having an average particle size of 500 micron or lower. Preferably the average particle size is between 200 and 400 micron.

According to a special embodiment, said cover glaze layer at least comprises a transparent glaze layer arranged over said printed pattern. In such case at least some or all of said structural features may be formed in said transparent glaze layer, e.g. with a depth such that they are substantially or completed located above the print layer.

According to another special embodiment which may or may not be combined with the above embodiments, said cover glaze layer possesses or is formed to have an irregular texture which functions as the aforementioned irregular or random relief features distributed over the surface of the ceramic tile.

Preferably, said printed pattern is a digitally printed pattern, and is preferably formed at least from the base colors cyan, magenta, yellow and black. Such printed pattern may be applied using a device similar to the one disclosed in EP 1 038 689, namely a single pass inkjet printer, wherein each tile is printed separately with a single pass of the respective tile underneath the fixed print heads of the device.

The most preferred embodiment of the present invention relates to a ceramic tile that is rectangular and oblong, wherein the cover glaze layer comprises a printed wood pattern with the grain lines running substantially in the longitudinal direction of the tile. The structural features in the surface of the tile follow the course of the printed grain lines. In between these structural features irregular or random relief may be available over the entirety or about the entirety of the surface of the tile.

Preferably, the ceramic tile of the invention, and in particular said cover glaze layer, has an abrasion resistance of at least Class 2, but preferably of Class 3 or higher, as measured according to ASTM C1027-99.

The invention also relates to a ceramic floor or a package comprising a plurality of tiles with mutually different printed patterns and corresponding structural features, in accordance with the above described invention. When the printed pattern is digitally achieved, it can conveniently be exchanged for another pattern, such that tiles with mutually different printed patterns are achieved. Preferably, also the relief is adapted such that the structural features of the new relief matches the new printed pattern. Preferably at least six or eight different tiles are produced. In such case a ceramic floor assembled from such tiles will profit from a natural look with convincing nuances.

The invention further relates to a method for manufacturing ceramic tiles, which could also be used for manufacturing the tiles of the present invention. Therefor the invention concerns a method for manufacturing a ceramic tile, wherein said ceramic tile has a ceramic base layer and a cover glaze layer with a printed pattern, and wherein the method comprises the following steps:

the step of forming the ceramic base layer;
the step of providing a glaze layer on said ceramic base layer;
the step of printing a pattern on said glaze layer;
the step of firing the ceramic base layer with the glaze layer having the printed pattern;

with the characteristic that the method further comprises the step of forming a relief having structural features corresponding to said printed pattern. It is clear that the obtained tile preferably shows the characteristics of the previously described ceramic tile of the invention. Preferably, said relief is basically formed as a plurality of excavations present in the generally plane and/or irregularly structured upper surface of the ceramic tile.

The relief can be obtained at several locations or instances during the process of manufacturing the tile. A non-exhaustive list of possibilities according to which the method of the invention can be put into practice are listed here below.

According to a first possibility, said relief is formed on the surface of said cover glaze layer before said step of firing and/or at the same time as said step of firing. Preferably said relief is achieved by means of a structured press element, such as a structured roller or a structured plate. When used during firing, said press element is preferably made from a ceramic material, such that it can withstand the firing temperatures, which preferably reach a maximum of at least 1000 degrees centigrade. When used exclusively before firing, said press element may be made from a metallic or a plastic material, like a thermosetting melamine based material or a silicone based material or similar.

Preferably each tile, or limited number of tiles, e.g. maximum four, has its own structured press element associated to it. In order to reach an acceptable number of different surface textures, each of them comprising features which are in accordance with the printed pattern, preferably differently structured press elements should be used. Preferably tiles with at least six or eight different surface textures are obtained from this first possible method of the invention.

In accordance with this first possibility, the ceramic tiles preferably already are provided with said printed pattern before said relief is being formed, such that printing may take place on a still flat glaze surface. In such case the printed pattern may be applied with any printing technique, such as with rollers, or with a digital printer, such as with an inkjet printer. To make sure the right surface texture or relief is applied to each tile, such that corresponding structural features are obtained, the method of the invention preferably contains a step of detecting the printed pattern, either directly or indirectly. With "directly" is meant that the actual print is recorded, e.g. with camera's or other sensors, and identified, such that the suitable press element can be selected to go with the tile, or a limited number of tiles. With "indirectly" is meant that tile is identified using the detection of a feature other than the print itself, but which is in a one-on-one relation to the printed pattern, e.g. a marking applied to the bottom of the tile. It is not excluded that the print would only be applied to the tile after the surface of the tile had already been provided with a relief. In such case preferably a non-contact printing process is used for realizing the printed pattern, such as a process using an inkjet printer. As an alternative, a contact printing process may be used, e.g. a process in which a roller printer having relatively soft, e.g. rubber rollers is applied. To make sure the right printed pattern is applied to each structured tile, such that corresponding structural features are obtained, the method of the invention preferably contains a step of detecting the surface structure of the tile, either directly or indirectly, such that the right print may be applied to each tile. With "directly" and "indirectly" having similar meanings as described above, but now with respect to the surface structure, instead of the printed pattern. A direct recording of the surface structure is e.g. possible with tactile sensors or with optical scanning devices.

The structural features applied by means of said first possibilities may be excavations in the generally plane and/or irregularly structured upper surface of the cover glaze layer, and/or zones of different gloss degree in said upper surface. In the case of zones of different gloss degree, these preferably also correspond to parts of the printed pattern, but in accordance with a deviating variant of the invention they are independent of the printed pattern.

According to a second possibility, said relief is formed on the surface of said ceramic base layer before said step of providing a glaze layer. Preferably, said relief is obtained during the step of forming said ceramic base layer. Such ceramic base layer may be formed starting form powder material, e.g. clay, which is pressed to form a so-called green tile, which may be dried and/or possibly fired to form a so-called biscuit tile. Said relief is conveniently obtained during the pressing of said powder material, for example by using a structured matrix in the respective press. Said structured matrix may be made from a metallic or a plastic material, like a thermosetting melamine based material or a silicone based material or similar.

Preferably each tile, or limited number of tiles, e.g. maximum four, has its own structured matrix associated to it. In order to reach an acceptable number of different surface textures, each of them comprising features which are in accordance with the printed pattern, preferably differently structured matrices should be used. Preferably tiles with at least six or eight different surface textures are obtained from this second possible method of the invention.

The common green tile presses are relatively small and press only one or a limited number of tiles at a time. Different surface textures could be achieved in several practical ways even with such small presses. According to a first possibility the structured matrix may be exchanged in between sequential pressings, preferably in an automatic way. According to a second possibility green tiles may be pressed in two or more presses each comprising a differently structured matrix and then further treated in similar ways, namely at least printed with similar printed patterns such that they can be mixedly installed in a ceramic floor. According to a third possibility use is made of a multiple compartment press, such that several green tiles can be pressed and structured simultaneously in the same press, each with its own associated press element or structured matrix. According to a fourth possibility one or more green tiles may be pressed successively in a plurality of presses, each equipped with a differently structured matrix, such that the obtained relief is in fact a superposition of the structures applied in successive press operations. According to an example four presses may be in operation and each equipped with a differently structured matrix. Each green tile is pressed either in one of these presses or in two of these presses successively. Such an operation would lead to ten different surface structures.

It is clear that in accordance with this second possibility of putting the invention into practice, the printed pattern is applied to the already structured upper surface of the ceramic tile. To make sure that the right printed pattern is applied to each structured tile, such that corresponding structural features are obtained, the method of the invention preferably contains a step of detecting the surface structure of the tile, either directly or indirectly, such that the right print may be applied to each tile. As stated before, the structured upper surface of the ceramic base layer is preferably first treated with a layer of glaze before printing takes place. The step of printing preferably applies a digital pattern by means of an inkjet printer, but roller printers, preferably with soft or rubber rollers, are not excluded.

According to a third possibility some relief features are made in accordance with said second possibility, while other relief features are made in accordance with said first possibility. Preferably the more coarse relief features are made in accordance with said second possibility. For example said second possibility may be applied for forming chamfered edges to the tile, or to form imitations of flake structures of stone, such as slate, or to imitate worn out or scraped away parts of wood, while said first possibility is applied for forming imitations of surface irregularities of stone or grain structure in wood. Said first possibility may also be used to form zones of differing gloss on the surface of the tile, while said second possibility is used to form excavations on said surface.

In general, in the methods of the invention, preferably use is made of a continuous firing unit or kiln, wherein each tile travels for, preferably 20 to 45 minutes, through a tunnel with heated and/or cooled zones. When a relief or part of the relief is being applied during the step of firing, as may be the case in the above mentioned first possibility of carrying out the method of the invention, the press element may be flat and travel along on the surface of the tile. In the case of oblong tiles, the tiles preferably travel through the kiln in their longitudinal direction.

It is noted that, in the case an inkjet printer is used to obtain said printed pattern, the change of the pattern preferably relates to a change of data to be printed. In the case a roller printer is used, the change of the pattern preferably relates to the use of a different roller or different sets of rollers, but may also relate to an indexing of a roller or a set of rollers, such that a different printing section along the circumference of the respective roller is selected. It is noted that the use of a different roller or set of rollers may be put to practice by replacing or exchanging the respective rollers at a roller position along the printing section in the production line, or by activating and deactivating the respective rollers already present along the printing section in the production line. Said replacing, exchanging, activating, deactivating may be performed manually or automatically.

It is further noted that the printed pattern is preferably applied in a fixed relationship to a predetermined point, such that the print is applied at a predetermined location of the tile, e.g. at a fixed distance, that may be zero, from an edge or corner, and that the printed pattern is preferably aligned to an edge, preferably a longitudinal edge in the case of oblong tiles. Such can be obtained through a detection of the upcoming tile, and using this detection to control the printer. Applying the printed pattern in a fixed relation to a predetermined point is advantageous for obtaining corresponding structural features in the relief.

It is advantageous for the correspondence between the relief and the printed pattern when the the is not subjected to firing operations in between the step of printing and the step of structuring, whichever comes first. Preferably, the the is not subjected to temperatures higher than 500 degrees centigrade in between these two steps. Preferably no extra heat is applied to the the in between these two steps, and even better, the the is maintained at the same temperature, which is preferably between 10 degrees and 80 degrees centigrade, for example room temperature or about 18 to 23 degrees.

BRIEF DESCRIPTION OF THE DRAWINGS

With the intention of better showing the characteristics of the invention, in the following, as an example without any limitative character, several preferred forms of embodiments are described with reference to the accompanying drawings, wherein:

FIG. 1 shows an example of a ceramic tile 1 imitating a one piece wooden plank. The tile is rectangular and oblong with the wood graining running substantially in the longitudinal direction of the tile.

FIG. 2 clarifies that the tile comprises a ceramic base layer 2, and a cover glaze layer 3 having a printed pattern 4. The tile has a relief formed by excavations 5 in its generally planar top surface. A plurality of the excavations 5, or structural features of the relief is present in accordance with the printed pattern 4, in this case with the darker areas of the printed pattern 4. These excavations 5 are following the course of the printed wood grains.

Figure 1:
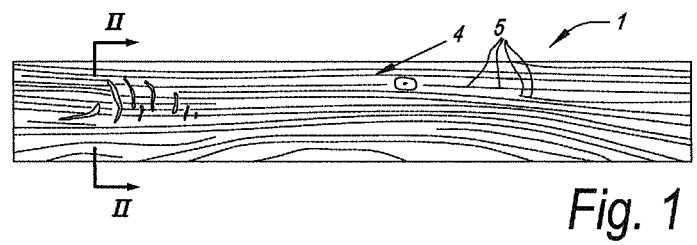
FIG. 1 represents a top view of a ceramic the in accordance with the present invention.
Figure 2:
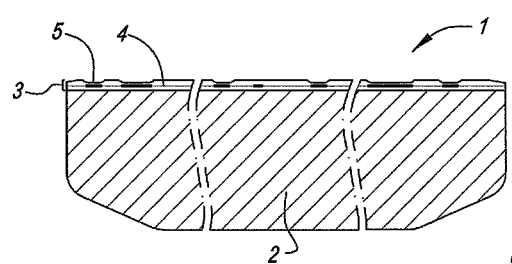
FIG. 2, in a larger scale, represents a cross-section in accordance with line II-II indicated on FIG. 1.

The excavations of FIG. 2 are formed in accordance with the above mentioned first possibility for the method of the invention, wherein said relief is formed in the cover glaze layer before firing. As can be seen from FIG. 2 the surface of the ceramic base layer 2 stays flat, or as good as flat.

Figure 3:
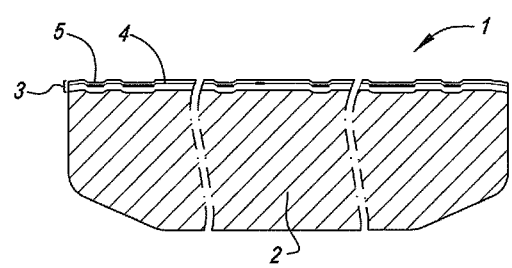
FIG. 3 in 4 in a view similar to that of FIG. 2 represent a variant.

FIG. 3 gives an example where the excavations 5 are formed in accordance with the above mentioned second possibility for the method of the invention, wherein said relief is formed in the surface of the ceramic base layer 2, and copied through the cover glaze layer 3.

Figure 4:
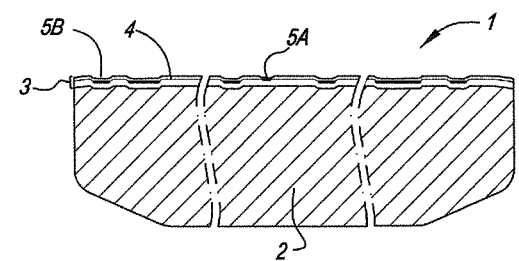

FIG. 4 gives an example where the relief is partially formed in accordance with said first possibility, namely the excavations 5A, and partially formed in accordance with said second possibility, namely the excavations 5B.

The present invention is in no way limited to the forms of embodiment described by way of example and represented in the figures, however, can such ceramic tile and method for manufacturing be realized in various forms and dimensions without leaving the scope of the invention, as defined by the appended claims.

The invention claimed is:

1. A ceramic tile having a ceramic base layer and a cover glaze layer comprising a printed pattern, wherein the surface of the ceramic tile comprises a relief having structural features corresponding to said printed pattern,
wherein said printed pattern is a digitally printed pattern.

2. The ceramic tile according to claim 1, wherein said printed pattern extends substantially over the entire surface of the ceramic tile.

3. The ceramic tile according to claim 1, wherein said printed pattern represents a wood or stone pattern, preferably representing only one one-piece wooden plank or stone tile over the entire surface of the ceramic tile.

4. The ceramic tile according to claim 1, wherein said printed pattern is a wood pattern and said structural features are lines following the course of the grain lines of the wood pattern or a plurality of successive dashes having a configuration following the grain lines of the wood pattern.

5. The ceramic tile according to claim 1, wherein said structural features have a depth such that they are completely situated above said ceramic base layer.

6. The ceramic tile according to claim 1, wherein said cover glaze layer at least comprises a glaze layer of uniform color arranged underneath said printed pattern.

7. The ceramic tile according to claim 1, wherein said cover glaze layer at least comprises a transparent glaze layer arranged over said printed pattern.

8. The ceramic tile according to claim 7, wherein at least some of said structural features are formed in said transparent glaze layer.

9. The ceramic tile according to claim 1, wherein said printed pattern is formed at least from the base colors cyan, magenta, yellow and black.

10. The ceramic tile according to claim 1, wherein said relief is basically formed as a plurality of excavations present in the generally plane upper surface of the ceramic tile.

11. A method for manufacturing a ceramic tile, wherein said ceramic tile has a ceramic base layer and a cover glaze layer with a printed pattern, and wherein the method comprises the following steps:
the step of forming the ceramic base layer;
the step of providing a glaze layer on said ceramic base layer;
the step of digitally printing a pattern on said glaze layer using a digital printing technique;
the step of firing the ceramic base layer with the glaze layer having the printed pattern;
wherein the method further comprises the step of forming a relief having structural features corresponding to said printed pattern.

12. The method of claim 11, wherein said relief is basically formed as a plurality of excavations present in the generally plane upper surface of the ceramic tile.

13. The method of claim 11, wherein said relief is formed on the surface of said cover glaze layer before said step of firing and/or at the same time as said step of firing.

14. The method of claim 11, wherein said relief is formed on the surface of said ceramic base layer before said step of providing a glaze layer.

15. A method for manufacturing a ceramic tile comprising the following steps:
   forming a ceramic base layer;
   providing a glaze layer on said ceramic base layer;
   digitally printing a pattern on said glaze layer using an inkjet digital printing technique;
   forming a relief having structural features corresponding to said printed pattern; and
   firing the ceramic base layer with the glaze layer having the printed pattern.

* * * * *